United States Patent [19]
Kuromitsu et al.

[11] 3,966,605
[45] June 29, 1976

[54] RESERVOIR

[75] Inventors: Hiromu Kuromitsu; Naoki Ohara, both of Toyota, Japan

[73] Assignee: Aisin Seiki Kabushiki Kaisha, Toyota, Japan

[22] Filed: Jan. 22, 1975

[21] Appl. No.: 542,930

[30] Foreign Application Priority Data
Feb. 20, 1974 Japan.............................. 49-020924

[52] U.S. Cl................................ 210/130; 210/172
[51] Int. Cl.² .................... B01D 27/10; E03B 11/00
[58] Field of Search ............ 210/130, 137, 168, 172

[56] References Cited
UNITED STATES PATENTS

| | | | |
|---|---|---|---|
| 2,707,562 | 5/1955 | Kasten ................................ | 210/130 |
| 3,184,063 | 5/1965 | Buckman ............................ | 210/130 |
| 3,305,095 | 2/1967 | Hathaway ........................... | 210/130 |
| 3,382,978 | 5/1968 | Rosaen ............................ | 210/130 X |
| 3,389,796 | 6/1968 | Fiala et al............................ | 210/130 |
| 3,666,101 | 5/1972 | Rasaen............................... | 210/172 X |
| 3,701,424 | 10/1972 | Brown et al. ........................ | 210/130 |
| 3,777,888 | 12/1973 | Zellbeck .............................. | 210/130 |

*Primary Examiner*—Theodore A. Granger
*Attorney, Agent, or Firm*—Pierce, Scheffler & Parker

[57] ABSTRACT

A reservoir fluidically connected to a fluid pressure source and comprising, a casing, a projection projected from one end of the casing into the casing and fixedly connected with the casing, a cylindrical member sealed hermetically and slidably mounted on the projection, a groove formed between a peripheral surface of the cylindrical member and an end portion of the projection and fluidically connected with the fluid pressure source, a chamber formed between the other end of the casing and an outer peripheral surface of the cylindrical member, and a spring interposed between the other end of the casing and the outer peripheral surface of the cylindrical member so as to constantly urge the cylindrical member, thereby keeping at a certain height the fluid surface within the reservoir regardless of the change of the fluid quantity reserved within an accumulator.

5 Claims, 2 Drawing Figures

RESERVOIR

BACKGROUND OF THE INVENTION

1. Field of the Invention

This invention relates generally to a reservoir in a hydraulic pressure actuating apparatus which requires an accumulator, and more particularly to a reservoir which incorporates an accumulator therein.

2. Description of the Prior Art

In the conventional reservoir, the height of the fluid surface within the reservoir is varied in response to the change of the fluid quantity reserved within the accumulator, so that when the hydraculic fluid is supplied and the fluid quantity is inspected, the hydraulic fluid within the accumulator must be discharged.

SUMMARY OF THE INVENTION

Accordingly, it is an object of the present invention to provide an improved reservoir adapted for obviating the aforementioned drawbacks of conventional systems.

Another object of the present invention is to provide a new and simplified reservoir incorporating an accumulator which is capable of keeping at a certain height the fluid surface within the reservoir regardless of the change of the fluid quantity reserved within the accumulator.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENT

Figure 1:
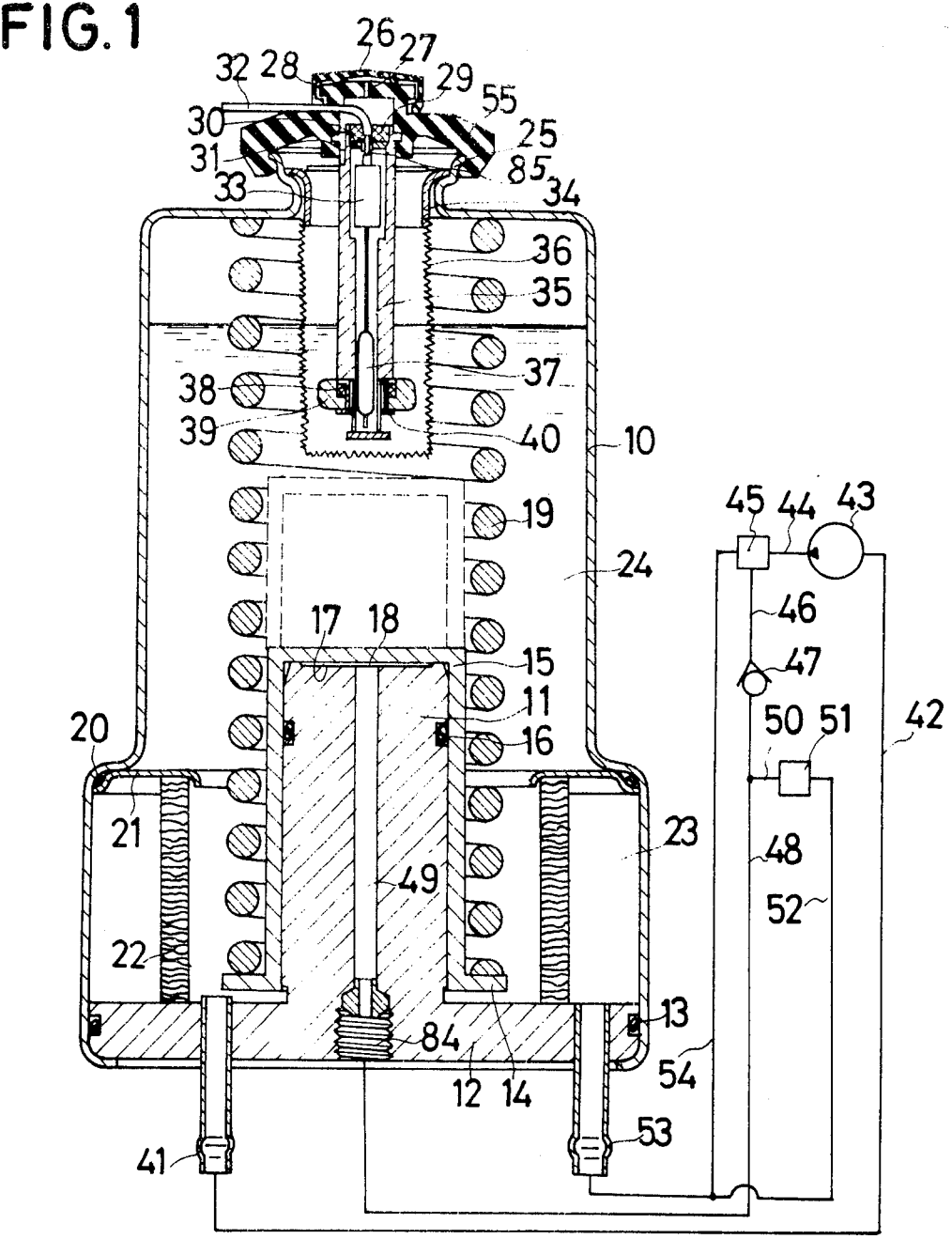
FIG. 1 is a sectional view of a reservoir incorporating an accumulator and utilized in the fluid pressure circuit constructed according to the present invention.

Referring now to the drawings, and more particularly to FIG. 1 thereof, the reference numeral 10 denotes a stepped cylindrical casing of a reservoir and a plug 12 having a cylindrical projection 11 is sealingly inserted into a lower portion of the casing 10 by means of an O-ring 13. The lower end portion of the casing 10 is caulked at the outer end surface of the plug 12, thereby, the plug 12 is prevented to break away from the casing 10. A slidable cylindrical member 15 having a flange portion 14 at the lower end portion thereof is sealingly and slidably mounted over the projection 11 of the plug 12 by means of an O-ring 16. A recessed groove 18 is formed by a hollow portion 17 disposed on the top end portion of the projection 11 of the plug 12 and the inner peripheral surface of the cylindrical member 15. The cylindrical member 15 is always urged in the direction of the plug 12 by means of a spring 19 interposed between the upper inner peripheral surface of the casing 10 and the flange portion 14 of the cylindrical member 15. A cylindrical filter 22 disposed between an annular plate spring 21 sealingly contacted with the inner peripheral portion of the casing 10 by means of an O-ring 20 and the inner peripheral surface of the plug 12 is urged into the direction of the plug 12 by the annular plate spring 21. The casing 10 is divided into a chamber 23 and a chamber 24 incorporated with the spring 19 by the plate spring 21 and the filter 22. When the filter 22 is closed by dust and dirt etc. the plate spring 21 is upwardly moved and released from the filter 22, namely, the plate spring 21 acts as a relief valve.

A cap 55 is detachably attached to an annular flange portion 25 extended from the casing 10 and a cap 26 is attached to the top end portion of the cap 55. An air communicating hole 27 is provided on the top end portion of the cap 55 and a passage 28 is formed between the cap 55 and the cap 26. A retainer 34 is mounted on the inner stepped portion of the flange portion 25 of the casing 10 and a strainer 36 is fixed to the lower portion of the retainer 34. A switch body 35 is fixed to the inner peripheral portion of the cap 55 at the top end portion thereof and a fixed member 29 is inserted into the inner top end portion of the switch body 35 through a holding member 30. A lead line 32 is connected to the fixed member 29 and a connecting member 85 is connected to the lead line 32 and to a resistance 33. A switch 37 is connected to the resistance 33, and a float member 39 and a magnet 38 are contacted to the lower end portion of the switch body 35. A holding member 40 is provided at the lower portion of the float member 39.

The chamber 24 within the casing 10 is fluidically communicated to a pump 43 via an outlet portion 41 provided in the plug 12 and a conduit 42 connected to the outlet portion 41. The pump 43 is fluidically communicated with the groove 18 through a conduit 44, a changeover valve 45 cannected to the conduit 44, a conduit 46, a check valve 47, a conduit 48 connected to the check valve 47, a port 84, and a passage 49 formed in the plug 12. A conduit 50 branched from the conduit 48 is connected to the chamber 23 through a conduit 50, an actuator 51 provided with a well-known closed type control valve, a conduit 52 connected to the actuator 51, and an inlet portion 53 connected to the conduit 52. A conduit 54 branched from the conduit 52 is fluidically communicated with the changeover valve 45.

The operation of FIG. 1 will now be described hereinbelow in detail;

When the pump 43 is activated the oil within the chamber 24 of the casing 10 will be sucked in the pump 43 through the outlet portion 41 and the conduit 42. Further when the oil sucked in the pump 43 is transmitted into the groove 18 via the conduit 44, the changeover valve 45, the conduit 46, the check valve 47, the conduit 48, the port 84, and the passage 49, the cylindrical member 15 is upwardly and slidably moved on the outer peripheral surface of the projection 11 of the plug 12 against the downwardly urging force of the spring 19 and then the volume associated with the groove 18 is increased and the oil pressure within the groove 18 is increased to a pre-set pressure $P_1$. When the oil pressure within the groove 18 reaches the pre-set pressure $P_1$ the change-over valve 45 is changed by a sensing means (not shown) for sensing the oil pressure within the groove 18, the oil transmitted from the pump 43 to the change-over valve 45 via the conduit 44 is transmitted into the chamber 23 through the conduit 54 and the inlet portion 53. Accordingly, the oil transmitted to the chamber 23 is filtered by the filter 22 and the filtered oil by the filter 22 is restored to the chamber 24.

The highly pressurized oil within the groove 18 is transmitted to the actuator 51 via the passage 49, the conduit 48 and the conduit 50 and then the actuator 51 is activated by the high pressurized oil. Consequently, when the oil pressure within the groove 18 is reduced to a pre-set pressure $P_2(P_1>P_2)$ the change-over valve 45 is changed and the oil transmitted from the pump 43 to the change-over valve 45 via the conduit 44 is transmitted to the groove 18 through the conduit 46, the check valve 47, the conduit 48, the port 84 and the passage 49 and therefore the oil is transmitted to the groove 18 until the oil pressure within the groove 18 reaches the pre-set pressure $P_1$.

The oil discharged from the actuator 51 is transmitted to the chamber 23 via the conduit 52 and the inlet portion 53. The oil transmitted to the chamber 23 is filtered by the filter 22 and then the filtered oil by the filter 22 is restored to the chamber 24. At this time, the oil quantity pumped out from the chamber 24 by the pump 43 and the oil quantity stored within the groove 18 are the same as each other, so that the height of the fluid surface within the chamber 24 is not changed.

Assuming that the oil quantity within the chamber 24 is decreased the change of the oil quantity is sensed by the float member 39 and then the float member 39 is lowered. When the float member 39 is lowered the switch 37 is switched through the magnet 38 and then it is noticed to a vehicle driver through the resistance 33 and the lead line 32 that the oil quantity within the chamber 24 has decreased.

Figure 2:
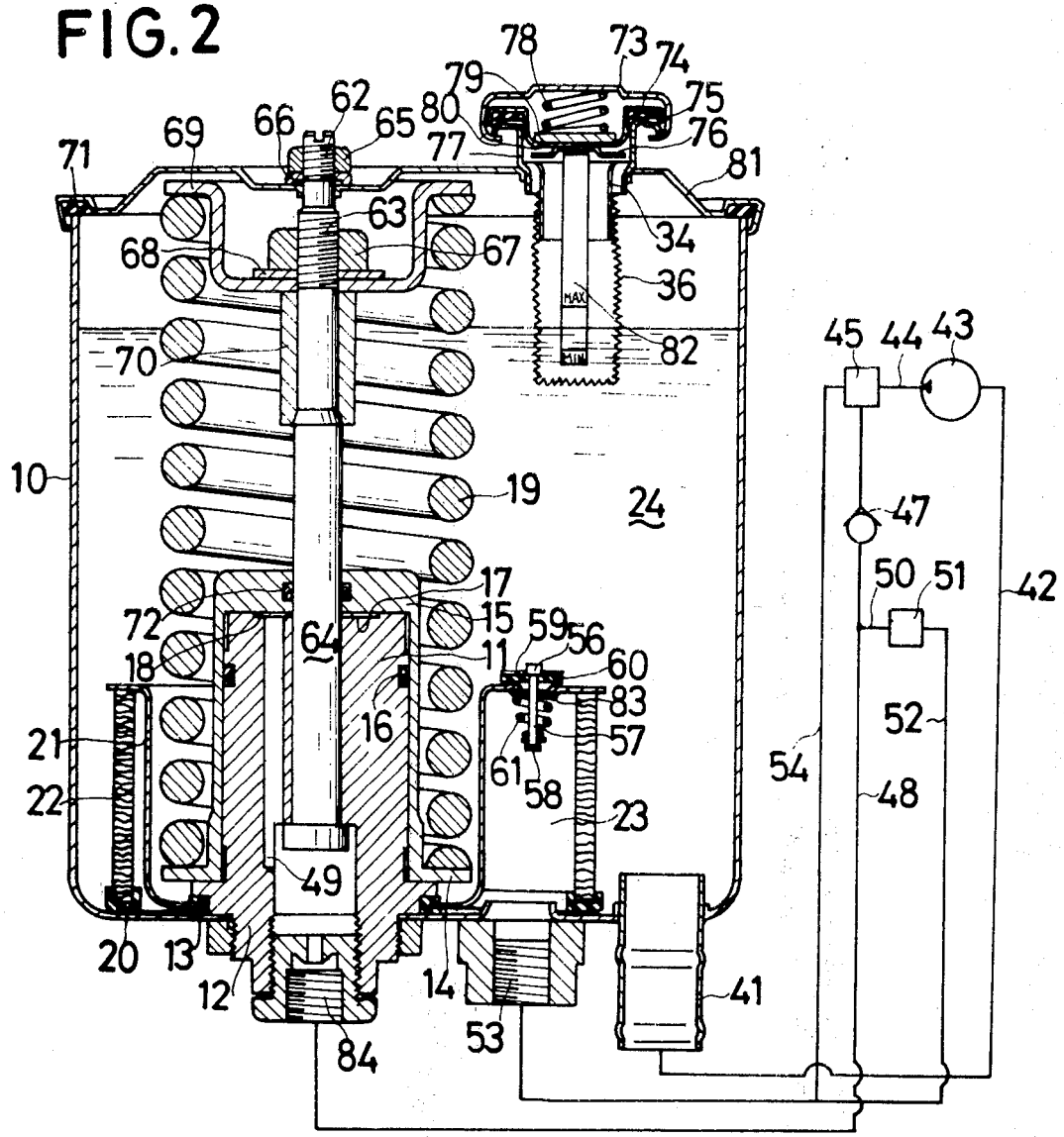
FIG. 2 is a similar view to FIG. 1, however, showing another embodiment according to the present invention.

Now referring to FIG. 2, the different construction from FIG. 1 will now be described hereinbelow in detail, however, the same numeral to FIG. 1 is utilized in the corresponding parts of FIG. 2;

A cover 81 is sealingly attached to the top end portion of the casing 10 through a seal member 71. One end of a rod 64 is fixed to the upper surface of the cover 81 by a bolt 62, a nut 65 and a washer 66 and further a bolt 63 of the rod 64 is fixed to a retainer 69 through a nut 67, a washer 68 and the holder 70. One end of the spring 19 is contacted with the retainer 69 and the other end thereof is contacted with the flange portion 14 of the cylindrical member 15. The other end of the rod 64 is sealingly inserted into the cylindrical member 15 and the projection 11 of the plug 12 by means of a seal ring 72. A poppet valve body 57 is mounted on the plate spring 21 for controlling the oil within the chamber 23 upon closing state of the filter 22. The poppet valve body 57 includes a top end portion 56, a plate portion 59, a valve member 60, a seat portion 83 formed on the plate spring 21, a lower end portion 58 connected to the body 57 and a spring 61 disposed between the lower portion of the seat portion 83 and the lower end portion 58. A flange member 77 is fixedly attached to the cover 81 and a cap 73 is airtightly covered to the flange member 77. A retainer member 74 is provided between the cap 73 and the flange member 77. A seal member 75 is sealingly disposed between the flange member 77 and the retainer member 74 and a plurality of holes 80 is provided in the retainer member 74. An air cleaner 79 is mounted on the top portion of the retainer 74, and a spring 78 is interposed between the cap 73 and the air cleaner 79. A holder 76 is provided at the lower portion of the retainer member 74 and an oil level gauge 82 is provided at the lower portion of the holder 76.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by Letters Patent of the United States is:

1. A reservoir having an accumulator incorporated therein, said accumulator being fluidically connected to a source of fluid pressure, and comprising, a casing;

a projecting member fixedly connected at one end to one end of said casing and projecting into said casing, said projecting member being provided with an axial passage therethrough fluidically connected to said source of fluid pressure and being provided with a recessed groove at the inner end thereof and fluidically communicating with said axial passage;

a cylindrical member closed at its inner end and sealingly and slidably mounted on said projecting member for increasing or decreasing the volume of said recessed groove of said projecting member in response to the fluid pressure from said source of fluid pressure;

a chamber for containing oil formed between the other end of said casing and said slidable cylindrical member; and a spring member disposed within said chamber for constantly urging said cylindrical member against increases in volume of the recessed groove of said projecting member when subjected to fluid pressure, one end of said spring member being in contact with said other end of said casing and the other end thereof with said cylindrical member.

2. A reservoir as set forth in claim 1 wherein said cylindrical member is provided with a flange portion for receiving said other end of said spring member.

3. A reservoir as set forth in claim 1, further comprising a filter for filtering the oil to said chamber and restoring said filtered oil to said chamber.

4. A reservoir as set forth in claim 3, further comprising a plate spring cooperable with said filter for serving as a relief valve.

5. A reservoir as set forth in claim 4, further comprising a chamber formed by said casing, said filter, and said plate spring.

* * * * *